US010641615B2

(12) United States Patent
Mohan et al.

(10) Patent No.: US 10,641,615 B2
(45) Date of Patent: May 5, 2020

(54) METHODS AND APPARATUS FOR DISPLAYING FLIGHT INTERVAL MANAGEMENT DATA FOR SELECTING APPROPRIATE FLIGHT MANAGEMENT SETTINGS (71) Applicant: HONEYWELL INTERNATIONAL INC., Morris Plains, NJ (US)

(72) Inventors: Rajeev Mohan, Bangalore (IN); Ravish Udupa, Bangalore (IN); Ruben Carrillo, Phoenix, AZ (US); Shashi Kumar Namde, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 55 days.

(21) Appl. No.: 15/675,256

(22) Filed: Aug. 11, 2017

(65) Prior Publication Data
US 2019/0049268 A1 Feb. 14, 2019

(51) Int. Cl.
G01C 23/00 (2006.01)
G08G 5/00 (2006.01)
(Continued)

(52) U.S. Cl.
CPC ............ G01C 23/00 (2013.01); B64D 43/00 (2013.01); G08G 5/003 (2013.01); G08G 5/0013 (2013.01);
(Continued)

(58) Field of Classification Search
CPC ...... G01C 23/00; B64D 43/00; G08G 5/0013; G08G 5/0021; G08G 5/003; G08G 5/0047; G08G 5/0052; G08G 5/0078; G08G 5/025
See application file for complete search history.

(56) References Cited

U.S. PATENT DOCUMENTS 5,121,325 A * 6/1992 DeJonge ............. G05D 1/0005
244/182
5,842,142 A * 11/1998 Murray ................. G01C 21/00
701/16
(Continued)

FOREIGN PATENT DOCUMENTS

EP 2869285 A1 5/2015

OTHER PUBLICATIONS

Extended European Search Report for Application No. 18176385.5 dated Jan. 28, 2019.

Primary Examiner — Nicholas Kiswanto
(74) Attorney, Agent, or Firm — Lorenz & Kopf, LLP (57) ABSTRACT A method and system for aircraft management for selecting a speeding profile mode for phases of a flight plan including: retrieving assigned space goals (ASG) corresponding to a plurality of achieve by point (ABP) designations for a target flight path of the aircraft wherein the target flight path is associated with a target aircraft; determining a target air speed and applicable speed profile modes by retrieving prior information of traffic history and flight plans of the target aircraft to achieve the ABP designations corresponding to an ASG retrieved; selecting from a plurality of applicable speed profile modes, at least one applicable speed profile mode for a phase of the target flight plan for the aircraft; and comparing statuses of the aircraft of at least a status of fuel remaining for a combination of the selection of the applicable speed profile mode and the phase of the target flight plan.

19 Claims, 5 Drawing Sheets (51) Int. Cl.
   *B64D 43/00* (2006.01)
   *G08G 5/02* (2006.01)
(52) U.S. Cl.
   CPC ......... *G08G 5/0021* (2013.01); *G08G 5/0047* (2013.01); *G08G 5/0052* (2013.01); *G08G 5/0078* (2013.01); *G08G 5/025* (2013.01)

(56) References Cited

U.S. PATENT DOCUMENTS

| | | | |
|---|---|---|---|
| 7,412,324 B1 | 8/2008 | Bagge et al. | |
| 7,437,225 B1* | 10/2008 | Rathinam | G08G 5/0013 340/961 |
| 8,566,012 B1 | 10/2013 | Shafaat et al. | |
| 8,781,651 B2* | 7/2014 | Tino | G06Q 10/047 701/3 |
| 8,862,373 B2 | 10/2014 | Dacre-Wright et al. | |
| 9,142,133 B2 | 9/2015 | Palanisamy et al. | |
| 9,193,442 B1* | 11/2015 | Young | B64C 19/00 |
| 9,310,222 B1* | 4/2016 | Suiter | G01C 23/005 |
| 9,536,434 B2 | 1/2017 | Scharl et al. | |
| 9,734,724 B2* | 8/2017 | Zammit | G08G 5/0039 |
| 2008/0228333 A1 | 9/2008 | De Menorval et al. | |
| 2011/0118908 A1 | 5/2011 | Boorman et al. | |
| 2011/0208376 A1 | 8/2011 | Mere et al. | |
| 2012/0035841 A1 | 5/2012 | Polansky et al. | |
| 2013/0144518 A1 | 6/2013 | Dacre-Wright et al. | |
| 2014/0244077 A1* | 8/2014 | Laso-Leon | G05D 1/0005 701/4 |
| 2014/0249701 A1 | 9/2014 | Latsu-Dake et al. | |
| 2014/0358415 A1* | 12/2014 | McDonald | G05D 1/101 701/120 |
| 2015/0120100 A1* | 4/2015 | Sacle | G01C 21/20 701/18 |
| 2015/0344148 A1* | 12/2015 | Schwartz | B64D 37/005 701/123 |
| 2016/0171895 A1 | 6/2016 | Scharl et al. | |
| 2016/0236790 A1* | 8/2016 | Knapp | B64C 11/001 |
| 2016/0358481 A1 | 12/2016 | Jonak et al. | |
| 2016/0363456 A1* | 12/2016 | Pujos | G01S 19/42 |
| 2017/0013061 A1* | 1/2017 | Coulmeau | G06F 8/36 |
| 2017/0068253 A1* | 3/2017 | Hedrick | G08G 5/0021 |
| 2018/0094932 A1* | 4/2018 | Skow | G01C 21/10 |

* cited by examiner

METHODS AND APPARATUS FOR DISPLAYING FLIGHT INTERVAL MANAGEMENT DATA FOR SELECTING APPROPRIATE FLIGHT MANAGEMENT SETTINGS

STATEMENT REGARDING FEDERALLY SPONSORED RESEARCH OR DEVELOPMENT

This invention was made with Government support under contract number NNL13AA03B awarded by the NASA Langley Research Center. The Government has certain rights in this invention.

TECHNICAL FIELD

Embodiments of the subject matter described herein relate to cockpit display methods and systems, more particularly, to cockpit display methods and systems for displaying traffic information received of a desired achieve by point (ABP) position for an aircraft while in flight with flight management system (FMS) settings for the aircraft for aiding a pilot in evaluating and selecting a particular FMS setting to achieve the desired ABP position along with other aircraft operating factors related to the FMS setting.

BACKGROUND

The ever-increasing amount of air traffic has caused a marked increase in the workload of flight crews and air traffic controllers in high traffic density areas around airports. The Next Generation (NextGen) overhaul of the United States airspace system and the companion Single European Sky ATM Research (SESAR) overhaul of the European airspace system creates various trajectory-based mechanisms to improve air traffic management on those continents. Some solutions include the increased use of time-based requirements including time-based aircraft spacing and separation in high traffic density areas.

In addition, electronic flight bag (EFB) solutions, which include electronic display systems for the flight deck or cabin crew member use, are gaining in popularity. For example, EFB devices can display a variety of aviation data or perform basic calculations (e.g., performance data, fuel calculations, etc.). In the past, some of these functions had to be manually entered using paper references or were based on data provided to the flight crew by an airline's flight dispatch function.

With such advances, flight interval management (FIM) has become a critical component of the Communications Navigation Surveillance Air Traffic Management (CNS ATM) modernization efforts such as the FAA Next Generation Air Transportation System and the Single European Sky ATM Research (SESAR) programs. FIM avionics automation in the cockpit enables the flight crew to fly an approach with an assigned time and distance-based spacing goal behind another aircraft enabling reduced variability in arrival rates and reduced average separation between arriving aircraft.

These and many more such time-based requirements demand the crew monitor the time and manipulate flight and thrust controls to achieve a result at the stipulated time. Currently existing human interfaces do not provide sufficient situational awareness of the time element and leaves achieving a result to the analysis and assumptions of the crew. In certain cases, if the aircraft reports earlier or later, the operation of other aircraft may be affected. Hence, the new requirements of the SESAR and the NextGen initiatives work towards the goals of achieving the economic aspects that result from space and fuel optimization. That is, both of these goals can only be achieved, in most instances, by saving time in flight which entails following and adhering strictly to a time element during the aircraft arrival.

Therefore, there exists a need to provide additional interfaces and tools to meet these goals and for more situational awareness applications that result in better time-based control to the crew of the aircraft and for controls that allow the crew to monitor and to enable the possibility of the aircraft achieving a required activity in accordance with a given time-based instruction.

Accordingly, it is desirable to use the flight interval management systems and flight management interval applications in this endeavor for at least the reasons that include such systems enable easy implementation in current and legacy aircrafts without additional wiring and display device attachments needed in their adoption.

Accordingly, it is desirable to provide one or more alternatives to the required use and flight management system (FMS) interfaces that facilitate these options by displaying appropriate interactions with aircraft onboard avionics. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for An aircraft management method for selecting a speeding profile mode for phases of a flight plan, the method including: retrieving assigned space goals (ASG) corresponding to a plurality of achieve by point (ABP) designations for a target flight path of the aircraft wherein the target flight path is associated with a target aircraft; determining a target air speed and applicable speed profile modes by retrieving prior information of traffic history and flight plans of the target aircraft for use in generating therefrom a target flight path for the aircraft to achieve the ABP designations corresponding to an ASG retrieved; selecting from a plurality of applicable speed profile modes which have been determined, at least one applicable speed profile mode for a phase of the target flight plan for the aircraft; comparing statuses of the aircraft of at least a status of fuel remaining for a combination of the selection of the applicable speed profile mode and the phase of the target flight plan; determining, from a particular speed profile mode, an estimated time of arrival for the ABP by the aircraft for each combination of selections; and choosing the combination of selections that achieves an optimum aircraft management for each phase of the flight plan by ascertaining comparisons of aircraft status of fuel remaining and determinations of estimated time of arrival to achieve the ABP designations for the aircraft for the flight plan of an actual flight.

Some embodiments of the present disclosure provide an aircraft management system for selecting a speeding profile mode for phases of a flight plan, the system including: an aircraft interface device (AID) for retrieving assigned space goals (ASG) corresponding to a plurality of achieve by point (ABP) designations for a target flight path of the aircraft wherein the target flight path is associated with a target aircraft; a flight management computer for determining a target air speed and applicable speed profile modes by retrieving prior information of traffic history and flight plans of the target aircraft from the AID for use in generating therefrom a target flight path for the aircraft to achieve the ABP designations corresponding to an ASG retrieved; a graphic user interface (GUI) couple within the FMC for selecting from a plurality of applicable speed profile modes which have been determined, at least one applicable speed profile mode for a phase of the target flight plan for the aircraft; a display of the GUI for comparing statuses of the aircraft of at least a status of fuel remaining for a combination of the selection of the applicable speed profile mode and the phase of the target flight plan, wherein the GUI further comprising: determining via the FMC therefrom an estimated time of arrival for the ABP by the aircraft for each combination of selections; and choosing from the GUI the combination of selections that achieves an optimum aircraft management for each phase of the flight plan by ascertaining comparisons of aircraft status of fuel remaining and determinations of estimated time of arrival to achieve the ABP designations for the aircraft for the flight plan of an actual flight.

Some embodiments of the present disclosure provide a method carried-out by flight management system onboard an aircraft, the method including: retrieving assigned space goals (ASG) corresponding to a plurality of achieve by point (ABP) designations for a target flight path of the aircraft wherein the target flight path is associated with a target aircraft; determining a target air speed and applicable speed profile modes by retrieving prior information of traffic history and flight plans of the target aircraft for use in generating therefrom a target flight path for the aircraft to achieve the ABP designations corresponding to an ASG retrieved; selecting from a plurality of applicable speed profile modes which have been determined, at least one applicable speed profile mode for a phase of the target flight plan for the aircraft; comparing statuses of the aircraft of at least a status of fuel remaining for a combination of the selection of the applicable speed profile mode and the phase of the target flight plan; and determining, from a particular speed profile mode, an estimated time of arrival for the ABP by the aircraft for each combination of selections.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Busy airports around the world will struggle to cope with the projected increase in the number of aircrafts flying. Constructing new runways is one option that can enable more takeoffs and landings at a given time. This is an extremely expensive option due to the high cost of construction, the real estate requirements, the need to ensure civilian populations residing nearby are not adversely affected etc. FIM compliant avionics enable airports to maximize the throughput of existing runways as well as offer airlines a fuel saving mechanism of flying optimized descent paths along with reduced vectoring off the planned flight path.

The EFB solutions requires the pilot to manually feed in the flight plans of a particular aircraft and a target aircraft in the EFB along with external condition information such as wind information. While the interval management operations are in progress, the pilot may often have to check the EFB for any new speed commands issued by the FIM application, which is then fed into the onboard systems. With the EFB solution, the pilot also may have to periodically check the EFB display to monitor any deviation from the assigned spacing goal (ASG) given by the ATC. This requires both head down and up activities of the pilot during the critical descent phase of flight, along with monitoring of ambiguous cockpit displays, which may make it difficult for the pilot to form an accurate mental picture of the current and predicted state of the aircraft.

The flight interval management (FIM) may assist the pilot in this function and has become an integral component for use with these EFB solutions and to provide better cockpit displays of data to the pilot. In addition, the FIM provides for the communications and navigation surveillance NextGen ATM SESAR in a time-based aircraft spacing. The flight management system (FMS) of which the FIM is a component provides the primary navigation, flight planning, and optimized route determination and route guidance for the aircraft, and is composed of the following interrelated functions: navigation, flight planning, trajectory prediction, performance computations, and guidance. With the many time-based requirements placed upon a crew during a flight, the FMS assists in executing aircraft operations to achieve the requirements.

Hence, with the many time-based requirements placed upon a crew during a flight and in enabling such related aircraft operations, the appropriate flight Interval management (FIM) solutions is a critical component of the Communications Navigation Surveillance. The FIM requires the pilot to achieve an Assigned Spacing Goal (ASG) for the aircraft with respect to a target aircraft to be achieved by the time the aircraft reaches a position called the Achieve-By-Point (ABP) which is provided by the Air Traffic Controller (ATC). Upon achieving the spacing goal, the aircraft is required to maintain the spacing goal till it reaches a controller assigned position called the Planned-Termination-Point (PTP). There is what's known as an "achieve" phase which lasts until the ABP position is reached which then is followed by what's known as a "maintain" phase which lasts between the ABP position and the PTP position or termination of the ABP position.

The favorable outcome of an FIM driven operation relies heavily on the particular aircraft consistently achieving the ASG upon reaching the ABP position and then maintaining the appropriate spacing until the particular aircraft crosses the PTP or termination point. In instances, for the FIM solutions, the interval management speed computed by various applications to achieve a particular ASG is driven by an approximation of aircraft operating factors of the cruise speed and descent speed for the particular aircraft and for a target aircraft. In such instances, the profile speed computed for the interval management do not make use of speed modes which are available in flight management systems (FMS), to use in applications and to drive Interval Management speed (IMS) calculation. Even though the FMS may generate an optimized profile for the assigned spacing goal (ASG), the pilot may not actually fly or achieve flight operations at an optimized speed because the speed modes are not used in such FMS optimized profiles and this may result in increased fuel usage. There is also no provision for pilot to evaluate multiple speed modes in a what-if simulation to determine the suitability of each speed mode in achieving the FIM spacing goal, along with the fuel used.

It is desirable to select and generate an interval management speed based on an available speed mode profiles used by the particular FMS of the aircraft to achieve cost optimization in an aircraft performance and also to optimize the profile for the aircraft operation during a particular flight segment.

It is desirable to simulate in real-time multiple simulations and scenarios of a particular aircraft operation in a flight segment to achieve a given ASG for each available speed mode in the FMS of the aircraft.

It is desirable for the FMS display unit to provide a system for communicating using an architecture compatible with a multi-function control and display unit (MCDU) onboard an aircraft.

It is desirable to compare fuel usage for each selected speed mode and speed mode profile for a flight segment in real-time in accordance with conditions monitored during an aircraft operation and to compare the fuel usage for multiple simulations of the particular aircraft operation when achieving the given ASG.

Certain terminologies are used with a regard to the various embodiments of the present disclosure. For example, a display unit is an aircraft onboard device that provides a user interface for a particular avionic system onboard an aircraft, which may include a Flight Management System (FMS), Communications Management Function (CMF), assigned spacing goal (ASG), achieve by point (ABP), automatic dependent surveillance broadcast (ADS-B), flight information services-broadcast (FIS-B) or other avionics systems. Flight crew members may use the FMS interface to perform tasks associated with flight planning, navigation, guidance, and performance A processor may be coupled to the display unit to format communications of data transmissions originating from one or more avionics systems onboard an aircraft, and which are directed to a display onboard the aircraft.

The subject matter presented herein relates to representations of a cockpit display of traffic information to achieve positions called achieve by point (ABP) and enabling a pilot to select a particular FMS settings in order to achieve the ABP and also optimize fuel consumption with the FMS setting selections. The FIM avionics automation in the cockpit enables the Flight Crew to fly an approach with an assigned time/distance-based spacing goal behind another aircraft enabling reduced variability in arrival rates and reduced average separation between arriving aircraft. The benefits of FIM include increased airport runway arrival rates and capacity during high demand periods and facilitates aircraft Optimized Profile Descents (minimizes fuel burn during Arrival and Approach) along with reduced Controller workload.

Further, the subject matter presented here provides systems and methods for displaying a time-based or ABP point requirement as to the operation of an aircraft. The display provides to the pilot (or aircrew) an overview of impacts of selections of FMS profiles for the ABP point requirements on aircraft operation, including without limitation, an indication of an ability to comply with the time-based requirement, ranges of time corresponding to permissible operation, and suggested modification of aircraft operation to achieve a time-based requirement. The pilot is able to view the impact of the potential time-based requirement on aircraft operating parameters in order to determine whether the time-based requirement can be achieved by a selection of an FMS profile.

Figure 1:
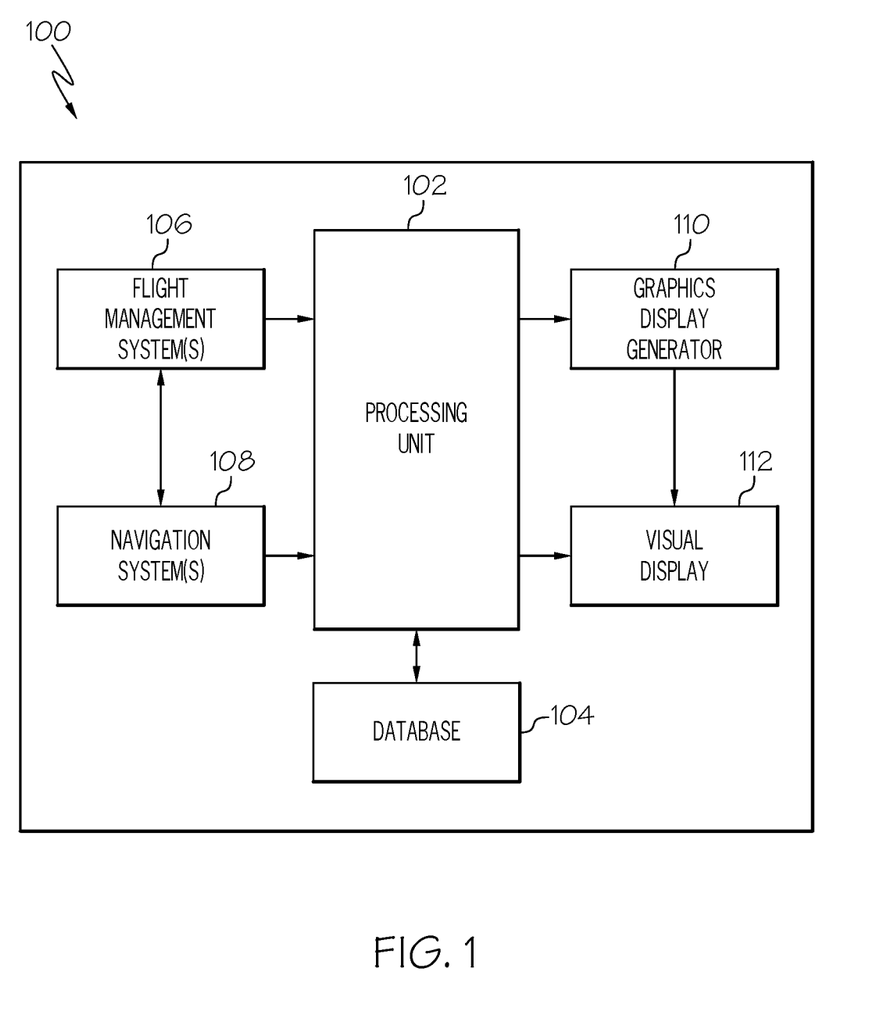
FIG. 1 depicts a block diagram of an exemplary aircraft navigation and control system, in accordance with the disclosed embodiments.

With reference now to the figures, FIG. 1 depicts a block diagram of an exemplary aircraft navigation and system 100, which may be used to implement various embodiments of the present disclosure. In these embodiments, system 100 depicts the aircraft's ability to achieve a time-based requirement, and in addition continually updates the received data to depicts the aircraft's progress in achieving a time-based requirement. The system 100 provides the information to the pilot or flight crew in a highly intuitive manner. The display and method of operation of the display may vary depending on whether the system is operating in the first mode or the second mode to display the time-based requirement.

For this exemplary embodiment, system 100 includes a processing unit 102, a database 104, a flight management system 106, a navigation system 108, a graphics display generator 110, and a visual display 112. Further, it is contemplated that while the system 100 appears in FIG. 1 to be arranged as an integrated system, the present disclosure is not intended to be so limited and may also include an arrangement whereby one or more of processing unit 102, database 104, flight management system 106, navigation system 108, graphics display generator 110, and visual display 112 is a separate component or a subcomponent of another system located either onboard or external to an aircraft. Also, for example, system 100 may be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present disclosure is not limited to aircraft displays, and system 100 may also be implemented for other types of vehicles' electronic displays (such as, for example, spacecraft navigation displays, ship navigation displays, submarine navigation displays, train navigation displays, motor vehicle navigation displays, etc.).

The processing unit 102 may be a computer processor such as, for example, a microprocessor, digital signal processor, or any suitable processor capable of at least receiving and/or retrieving aircraft flight management information (e.g., from flight management system 106), navigation and control information (e.g., from navigation system 108), terrain information, including waypoint data and coordinate data for airports, runways, natural and man-made obstacles, etc. (e.g., from database 104), generating display control signals for a visual display of the aircraft flight management information, the navigation and control information (including, for example, a zero pitch reference line, one or more heading indicators, tapes for airspeed and altitude, etc.), the terrain information, and sending the generated display control signals to a graphics display generator (e.g., graphics display generator 110) associated with an onboard visual display (e.g., visual display 112).

For this exemplary embodiment, system 100 also includes database 104 coupled to processing unit 102 (e.g., via an I/O bus connection). Database 104 may also include, for example, a terrain database, which may include the locations and elevations of natural terrain obstacles such as mountains or other elevated ground areas, and also the locations and elevations of man-made obstacles such as radio antenna towers, buildings, bridges, etc. As another example, airport and runway location data, and other types of high priority target data (e.g., locations of incoming traffic to avoid, constructed waypoints, obstacles in the aircraft's flight path, etc.) may be retrieved and/or received by processing unit 102 from a suitable source of such data, such as, for example, an onboard flight management system database (e.g., a component of flight management system 106), an onboard navigation database (e.g., a component of navigation system 108), an onboard sensor or radar devices, or an external database (e.g., via a data communication up-link).

System 100 may also include flight management system 106 and navigation system 108 coupled to processing unit 102 (e.g., via a respective I/O bus connection). Notably, flight management system 106 and navigation system 108 are depicted as separate components in the example embodiment of system 100. Alternatively, flight management system 106 and navigation system 108 and/or their functions of flight management, navigation and control may be combined in one system (e.g., in flight management system 106), or navigation system 108 may be a subsystem of flight management system 106. In any event, flight management system 106 and/or navigation system 108 may provide navigation data associated with the aircraft's current position and flight direction (e.g., heading, course, track, etc.) to processing unit 102. The navigation data provided to processing unit 102 may also include information about the aircraft's airspeed, ground speed, altitude (e.g., relative to sea level), pitch, and other important flight information if such information is desired. In any event, for this example embodiment, flight management system 106 and/or navigation system 108 may include any suitable position and direction determination devices that are capable of providing processing unit 102 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

For this exemplary embodiment, system 100 also includes graphics display generator 110 coupled to processing unit 102 (e.g., via an I/O bus connection) and visual display 112. Visual display 112 may also be coupled to processing unit 102 (e.g., via an I/O bus connection). For example, visual display 112 may include any device or apparatus suitable for displaying various types of computer-generated symbols and information, in an integrated, multi-color or monochrome form, representing one or more of pitch, heading, flight path, airspeed, altitude, targets, waypoints, terrain, flight path marker data, and notably, a graphical indication of the aircraft's progress in achieving a time-based requirement. Using aircraft position, direction (e.g., heading, course, track, etc.), speed data retrieved (or received) from flight management system 106 and/or navigation system 108, wind data (e.g., speed, direction) and terrain (e.g., waypoint) data retrieved (or received) from database 104, processing unit 102 executes one or more algorithms (e.g., implemented in software) for determining the current position of the host aircraft, its heading (course, track, etc.), and computing an ability to achieve the time-based requirement, such as, without limitation, an ETA for a predetermined location (e.g. waypoint) based on the aircraft's current speed. Processing unit 102 then generates a plurality of display control signals representing, among other things, a graphical indication showing the aircraft's progress in achieving the time-based requirement, and sends the plurality of display control signals to visual display 112 via graphics display generator 110. Preferably, for this embodiment, visual display 112 is an aircraft cockpit, multi-color display (e.g., a Primary Flight Display). Graphics display generator 110 interprets the received plurality of display control signals and generates suitable display symbols, which are presented on a screen or monitor of visual display 112.

Notably, although an existing cockpit display screen system may be used to display the above-described flight information symbols and data, the present disclosure is not intended to be so limited and may include any suitable type of display medium capable of visually presenting multi-colored or monochrome flight information for a pilot or other flight crew member. As such, many known display monitors are suitable for displaying such flight information, such as, for example, various CRT and flat-panel display systems (e.g., CRT displays, LCDs, OLED displays, plasma displays, projection displays, HDDs, HUDs, etc.). For example, visual display 112 may be implemented as a heads-down Primary Flight Display or as a heads-up display (HUD).

FIG. 1 is a system 100 for providing an alternative user interface for FMS profile display unit, in accordance with the disclosed embodiments. The system 100 operates to replace the diverse displays and provide a streamlined and user-friendly graphical user interface (GUI). The system 100 may include, without limitation, a computing or processing unit 102 that communicates with one or more avionics systems onboard the aircraft and at least one server system, via a data communication network. In practice, certain embodiments of the system 100 may include additional or alternative elements and components, as desired for the particular application.

The aircraft may be any aviation vehicle that uses a flight management system 106 as a primary user interface for flight crew interaction with the plurality of avionics systems onboard the aircraft. The aircraft may be implemented as an airplane, helicopter, spacecraft, hovercraft, or the like. The one or more avionics systems may include a Flight Management System (FMS), aircraft interface device (AID) or the like. Data obtained from the one or more avionics systems may include, without limitation: flight plan data, aircraft state data, weather data, brake system data, fuel and weights data, runway analysis data, aircraft performance data, or the like.

Figure 2:
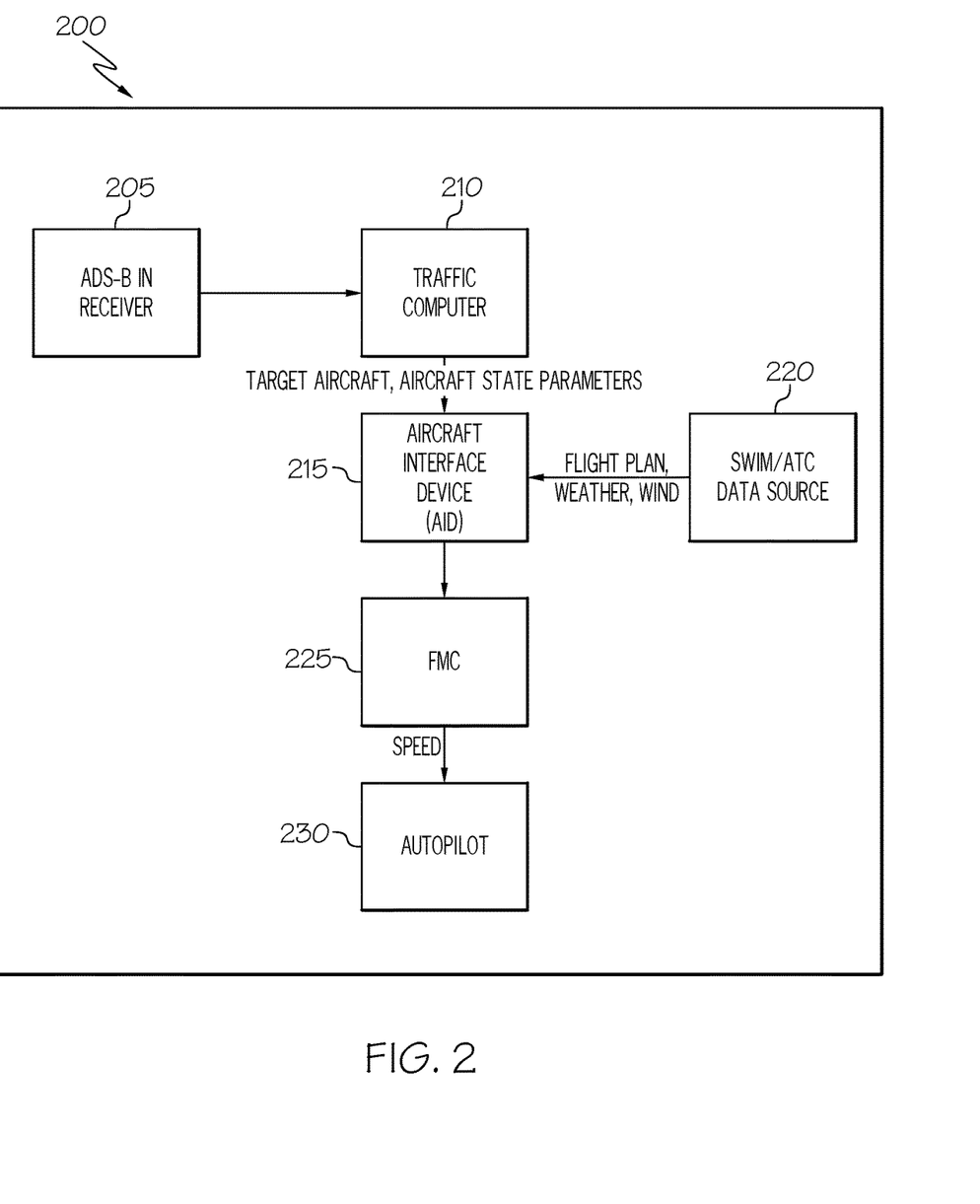
FIG. 2 depicts a functional block diagram of a computing device for navigation and flight management operations in accordance with the disclosed embodiments.

FIG. 2 depicts a functional block diagram of a computing device 200 which is directed to navigation and flight management operations and operates within the FMS 106 and navigation systems of 108 of FIG. 1. Turning back to FIG. 2, FIG. 2 includes an automatic dependent surveillance broadcast (ADS-B) receiver which is an integral component of NextGen national airspace strategy were the aircraft receives by the receiver 205 flight information services-broadcast (FIS-B) and traffic information services broadcast (TIS-B) data and other ADS-B data such as direct communication from nearby aircrafts. The receiver 205 is connected to the traffic computer 210 which receives the ADS-B in and generates the target aircraft state parameters to an aircraft interface device (AID) 215. Also, the AID 215 receives the flight data, weather, wind as well as inputs received from a System Wide Information Management/Air Traffic Control (SWIM/ATC) data source 220. The Aircraft interface device (AID) is coupled to the FMC 225 and sends speed data to the autopilot 230.

Figure 3:
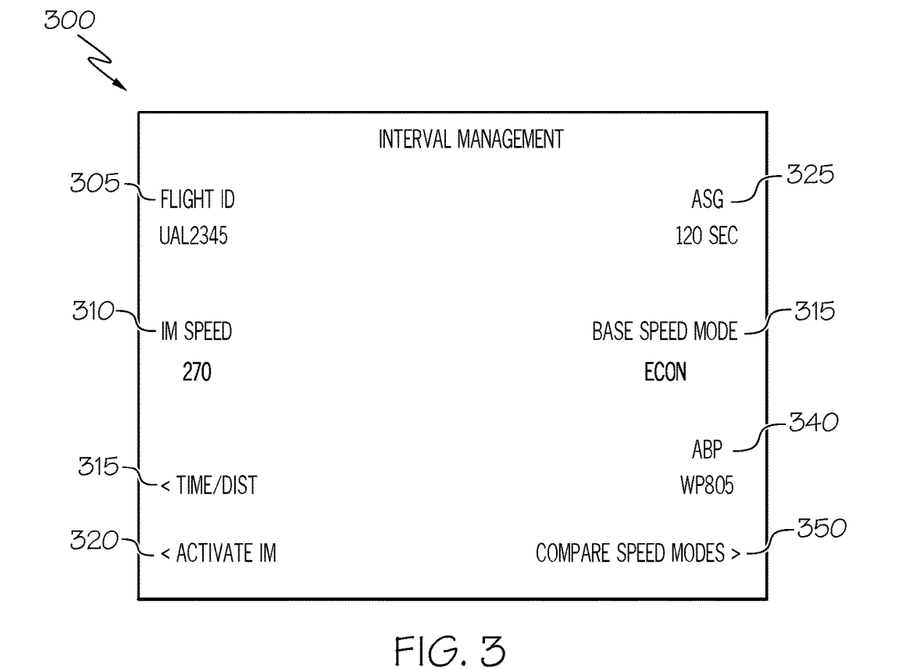
FIG. 3 depicts a diagram of a graphical user interface (GUI) configured to present flight interval management speed mode data, in accordance with the disclosed embodiments.

FIG. 3 depicts a diagram of a graphical user interface (GUI) 300 configured to present FIM speed mode data, in accordance with the disclosed embodiments. It should be noted that FIG. 3 depicts one exemplary embodiment of the GUI 300, and that some implementations of the GUI 300 may include a different set of graphical elements or components. Here, the GUI 300 includes a title 302 associated with the Interval management data presented. In the exemplary embodiment shown, the GUI is presenting an interval management (IM) speed mode for a selected speed mode.

FIG. 3 includes a display flight ID title 305 of "flight ID" illustrated and below the display flight ID title 305 is a field for the flight ID of "UAL2345". A display ASG title 325 is illustrated and below the display ASG title 325 is the field of the ASG of "120 secs". A display IM speed title 310 is illustrated and below the display IM speed title 310 is the field of the IM speed of "270". A display speed mode title 330 is illustrated and below the display speed mode title 330 is the field of the speed mode selected of "ECON". A display ABP title 340 is illustrated and below the display ABP title 340 is the field of the ABP of the waypoint "WP805". A navigation button with a "<time/dist" 315 button is illustrated for navigating to a page showing time and distance data. A navigation button with a "<activate IM" button 320 is shown for navigating to a page to activate IM. Finally, a navigation button with the title "compare speed modes>" is shown to navigate to the page entitled "interval management speed mode comparison" of FIG. 4 to the pilot where the pilot would, as an example, using the user interface (UI) navigate to the next page to "compare speed modes".

Figure 4:
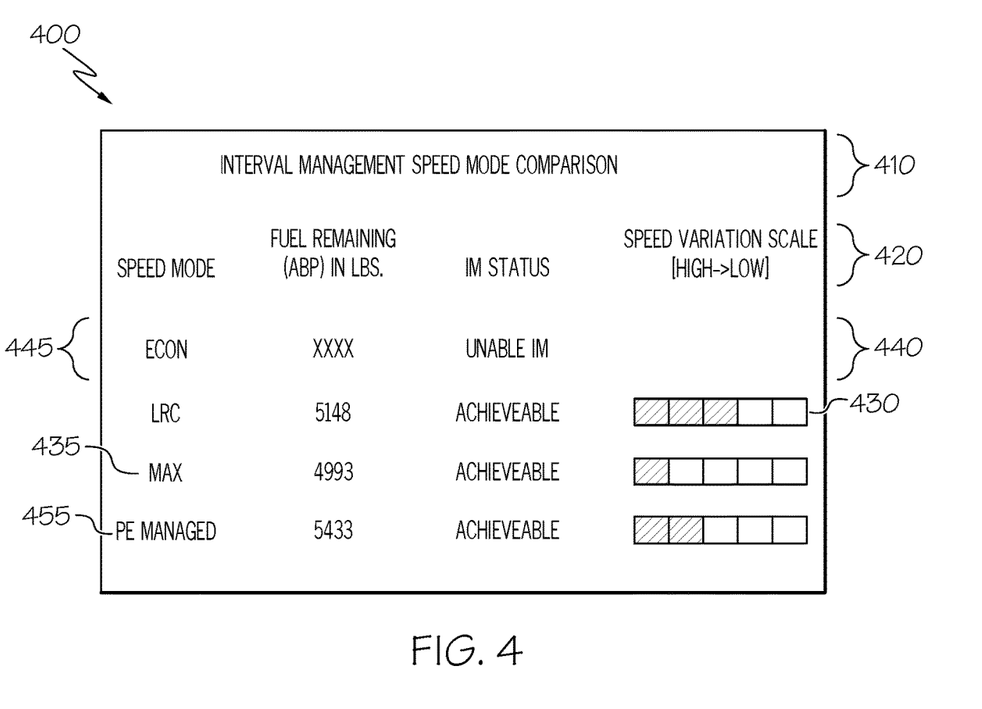
FIG. 4 depicts a diagram of a graphical user interface (GUI) configured to present comparisons of speed mode data, in accordance with the disclosed embodiments.

FIG. 4 depicts a diagram of a graphical user interface (GUI) 400 configured to present comparisons of speed mode data, in accordance with the disclosed embodiments. It should be noted that FIG. 4 depicts one exemplary embodiment of the GUI 400, and that some implementations of the GUI 400 may include a different set of graphical elements or components. FIG. 4 illustrates the user interface page for comparing available speed modes and at 410 entitled "interval management speed mode comparison" where the ASG achievement status with the fuel usage data is displayed in accordance with an embodiment. FIG. 4 is categorized in four items in a row at 420 with the titles of "speed mode"; "fuel remaining (ABP) in lbs.", "IM status", and "speed variation scale [High→low]". Below this row are the field of each of the categories. In a first instance, of a row at 440, under the "speed mode" category, the speed mode is shown as "ECON", in the next category "fuel remaining (ABP) in lbs" the data is shown as "XXXX" or not known. Next, the "IM status" category is shown as "UNABLE IM". In other words, the for the speed mode of "econ" or economy the remaining fuel is likely too low to be shown and the IM status is unable to achieve the ABP point with this speed mode.

The next row at 430 shows a "speed mode" of long range cruise "LRC", "Fuel Remaining (ABP) in LBS." of "5148" and an "IM Status" of "ACHIEVABLE." In addition, along with the "ACHIEVABLE" status, "a speed variation scale" indicates by the light emitting diode (LED) indicator that with this selection of speed mode that the "IM status" is more than likely and there will be less likelihood of speed variations preventing the "IM status" from be achieved. In other words, the LED indicator gives the pilot along with "IM status" readout that is achievable, assurance of a higher likelihood that the "IM status" will be achieved. For the row at 435, the "speed mode" is "MAX", the "Fuel Remaining (ABP) in LBS." of "4993" and an "IM Status" of "ACHIEVABLE". However, in this case, the LED indicator is lower than in the previous case for the "speed variation scale". Thus, the pilot has less assurances that "IM status" will be achievable with the given speed mode of "MAX" but can weigh the more riskier speed mode selection with the lesser amount of fuel remaining of "4993" lbs. than the "LRC" speed mode with fuel remaining of "5148".

Finally, in the last row at 455, shows a "speed mode" of an autopilot engaged speed mode as a "PE MANAGED" with "Fuel Remaining (ABP) in LBS." of "5433" and an "IM Status" of "ACHIEVABLE". The LED indicator for the "speed mode variation scale" is higher than the previous case at 435 for a "speed mode" of "MAX" but less that of the speed mode of "ECON" at 445. In other words, in an exemplary embodiment, the user or pilot would view each of the "speed modes" and weigh the speed mode for selection against the other factors of the aircraft operation of the "Fuel Remaining (ABP) in LBS." of and an "IM Status" of "ACHIEVABLE" and further the likelihood of "ACHIEVABLE" by viewing the "Speed variation scale" indicator levels, which show the degree of magnitude of success. Hence, the page of FIG. 4 provides a simple, but comprehensive view of relevant factors of fuel consumption and speed modes to achieve a designated ABP and further enables the pilot to use judgement by weighing likelihoods of success of achieving the ABP point with a particular speed mode selected using the speed variation indicator scale. Further, the speed variation indicator implicit to its operation is the further monitoring of certain material conditions including wind and temperature which affect whether the speed mode selected will achieve the designated ABP. Moreover, the speed variation scale indicator is not a static indicator but is responsive to external changes and can weigh external conditions to determine it the ABP continues to be achievable or not. This allows a pilot to focus on the end point of achieving the "IM status" and not focus on indirectly relevant factors or have to manually make such judgment details.

Figure 5:
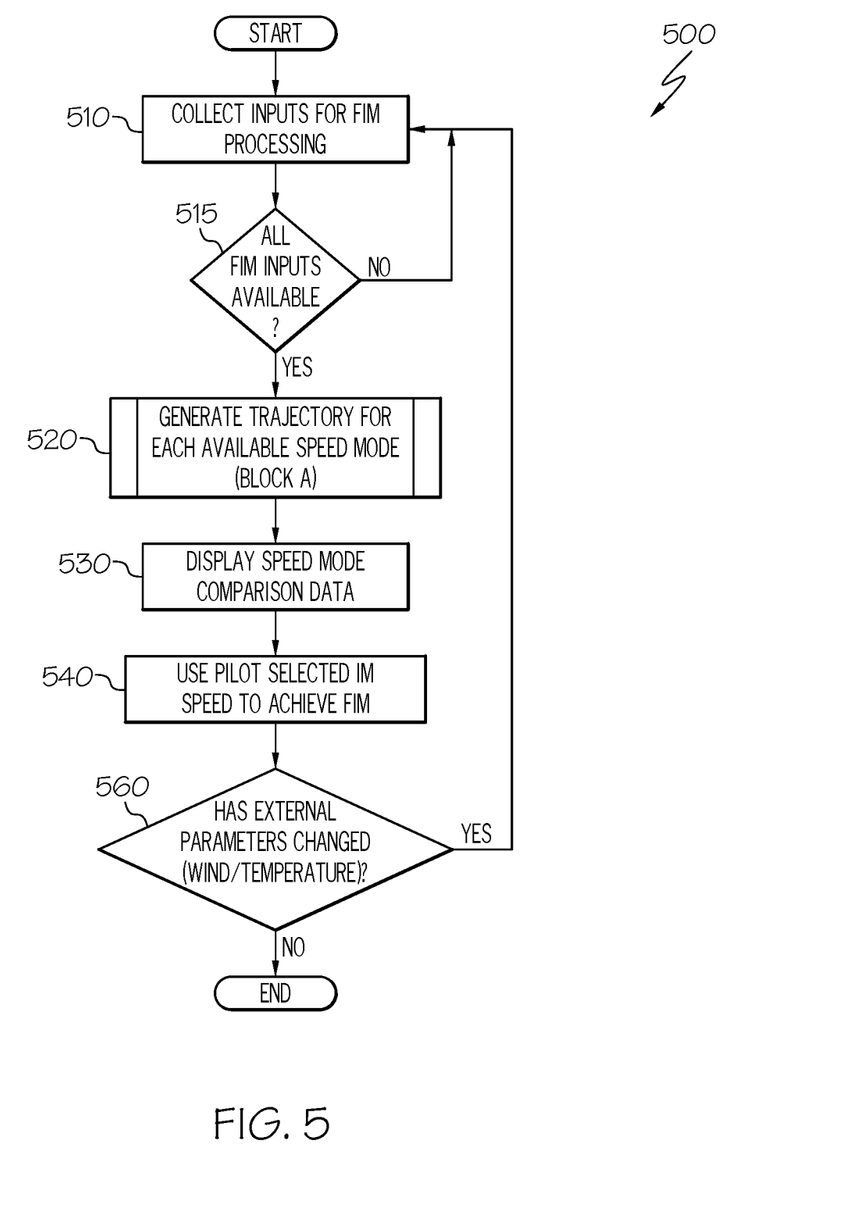
FIG. 5 depicts a flowchart that illustrates a process for computing interval management speeds based on a particular profile of a speed mode selected for a respective phase of a flight in accordance with the disclosed embodiments.

FIG. 5 is a flowchart that illustrates an embodiment of a process 500 for computing interval management speeds based on a particular profile of a speed mode selected for a respective phase of a flight and for communicating using an FIM architecture compatible with a multi-function control and display unit (MCDU) onboard an aircraft, in accordance with the disclosed embodiments. The FIM architecture compatible with the MCDU includes, without limitation, a plurality of MCDU communication connections (e.g., MCDU input connections, MCDU output connections) which connect the MCDU to one or more avionics systems onboard the aircraft.

The flowchart of FIG. 5 of the FIM system operation in accordance with an embodiment, initially, at 510, all the inputs for the FIM processing are collected. For example, in accordance with an exemplary embodiment, inputs such as an assigned spacing goal (ASG) for a particular achieve by point (ABP) position retrieved and a particular targeted flight plan for the aircraft are collected by the FIM for processing. At 515, a feedback loop is created to determine if all the necessary FIM inputs are available and if not the flow returns to 510 and additional inputs for the FIM are collected for processing. This feedback operation continues until all FIM inputs are collected for processing. At 520, once all the inputs are available, the FIM makes certain determination by processing the input in accordance with various application solutions. A determination of the target aircraft speed and possible speed modes is generated by retrieving the traffic history information for the target aircraft, and the related flight plan; from which generates a trajectory for the target aircraft. Next, additional determinations are generated such as a determined estimated time of arrival at a designated ABP position.

At 530, the trajectory is generated for a particular flight plan by taking into account a selected profile speed mode from the FIM. Next, if the ASG received is a time-based parameter to the FMS system then additional amounts of time for a change or a dynamic required time of arrival for the particular ABP are computed by adding a spacing goal to an estimated time of arrival for traffic in accordance with the particular designated ABP position. In order to do so, the estimated time of arrival for the designated ABP position is compared to the trajectory of the particular aircraft trajectory with the added amount of the change or dynamic required time of arrival. This difference in time enables a time error to be generated which may be corresponded to a ground speed of the particular aircraft and in turn can be adjusted so that estimated time of arrival at the designated ABP position for particular aircraft matches or at least corresponds to the change or dynamic required time of arrival added or inserted to the ABP position.

For modulating the speed in greater or less amounts, that is to speed up or slow down the particular aircraft trajectory; initially, an average ground speed is computed till the planned termination point (PTP). Once, the average ground speed is computed, a delta is computed which is the difference or in speed from the average computed ground speed computed which is required to meet dynamic required time of arrival. This delta change may in addition be mapped to FIM profile speed mode so that change in speed follows characteristics of profile speed when the FIM profile is selected. Additionally, a recomputed profile speed may be used where successive refinements of the trajectory are applied until a solution stabilizes or an unable to achieve condition is reached. In other words, incremental changes over a narrow range are added or subtracted to the profile speed to generate a recomputed profile speed of the profile in an attempt to reach an appropriate stable solution and further, a determination is made by the incremental changes when a stable solution is not reached that such a stable solution is unlikely or not achievable.

In addition, changes may be received in real-time during flight operation of likely changes in traffic estimated time of arrival at a designated ABP, that is the estimated time of arrival may be changed by ATC or external conditions may have such resulting impact. In turn, such changes in the traffic estimated time of arrival at a designated ABP position would also have an impact on the dynamic or required time of arrival at the ABP of the particular aircraft trajectory. In order to alleviate the impact of such changes, an additional algorithmic solution may be used such as a full phase requirement time of arrival algorithmic solution which assists in generating additional data through the use of vertical profiles of the particular aircraft that would enable further optimization and the ensuring that the generated dynamic time constraint previously generated would be met.

With a continuing reference to FIG. 5, the multiple speed modes which have initially been selected at 540 may be selected again in a repeated matter, that is a selection of a speed mode is not static and subject to change as desired by the pilot when observing other aircraft operation factors or receiving new inputs of data. The flow allows for repeating the flow from 510 onwards to 550 in a multitude of repeated manners either of all the steps or individual steps were unchanged or immaterial change steps may be overlook. In other words, the repeating is performed in a selected manner in a constant repeating flow to determine the most suitable speed mode to be used for generating the IM speed and to accommodate for any changes in real-time. In addition, the user or pilot may also view or be shown an indicator which indicates the likelihood of meeting a designated ASG at the ABP point and fuel used for each selected speed mode, to enable optimal speed mode selection. The indicator may be of a variety of display types including digital or analog instrumentation type displays that show incremental, material or alternative type displays of the likelihood of achieving the designated ASG at the received ABP point.

In addition, there may other attributes available when making selections of particular speed modes. In an exemplary embodiment, a quality attribute of selecting a particular speed mode such as speed variations of a particular speed mode may be included. For example, a speed mode selection can result in generation of a speed schedule where there is a significant degree of speed variation within the selected speed mode selected as well as intermittent so called "jumps" in instances of speed value of the selected speed mode. Hence, for optimization, a user or pilot likely desires speed mode with least such variations. In order to enable such selection of choosing a speed mode with the least speed variation, a scale may be displayed with the speed mode selection that shows or highlights the variations graphically between a high and low variation on a comparison display in the GUI.

Continuing with FIG. 5, at 530, a display mode in the GUI of the comparison data for each of the FIM profiles is displayed for the pilot to select a particular FIM profile. The pilot makes the FIM selection at 540 by selecting an IM speed to achieve the particular or desired FIM. At 550, inputs received at 510 are re-assessed, that is a determination is made is the input parameters have changed. If this is the case, the especially for the material parameters such as wind conditions and temperature conditions, the flow reverts to 510 and proceeds to recollect the parameters to regenerate the trajectory data. Alternatively, if the change in parameters is deemed to be minimal or non-material, the system may simply assign a delta or correction amount to the IM speed for display and for pilot selection of the IM to the achieve the FIM.

Figure 6:
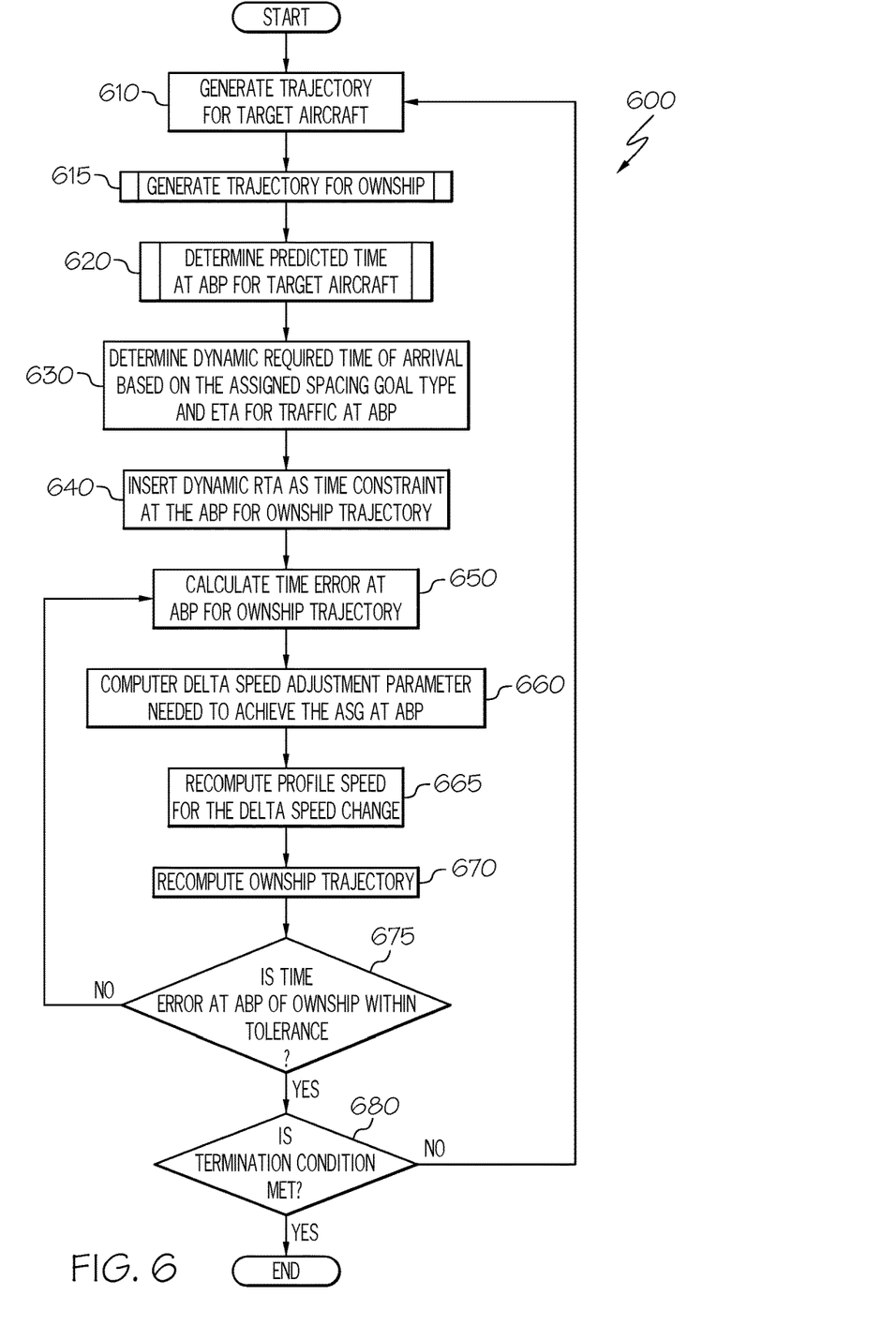
FIG. 6 depicts a flowchart that illustrates a process for computing the interval management speed based off a speed mode selected for a respective phase of flight of the aircraft, in accordance with the disclosed embodiments.

FIG. 6 is a flowchart that illustrates an embodiment of a process 600 for computing the interval management speed based off a speed mode selected for a respective phase of flight of the aircraft, in accordance with the disclosed embodiments. The FIM architecture is coupled to a plurality of communication connections (e.g., through the MCDU input connections, MCDU output connections) which connect to one or more avionics systems onboard the aircraft as well as enable the monitoring of external parameters and conditions.

The process 600 receives in the cockpit through various avionic systems a display of Traffic Information (CDTI) which lists all the surrounding traffic around the particular aircraft in flight for viewing by the user or the pilot. In an exemplary embodiment, the pilot may choose flight ID of a particular traffic from the list that surrounds the aircraft, or may enter an ATC assigned specific traffic data to follow the flight ID of the chosen flight and then enter the data into a user interface page of the GUI provided in flight management system (FMS). Once the data is entered or selected of the chosen Flight ID, processors of the FMS extract the necessary data for computation using various solutions of related flight interval management data which has been received via the broadcast from ADS-B and then sent to the traffic computer of the FMS and as well as data received from the SWIM/ATC data source. The FMS using data extraction techniques of data of the flight plan and flight ID selected or entered, proceeds within a time period of approximately 15 minutes to extrapolate certain algorithmic predictions of traffic data for a particular Flight ID. That is, once data of the flight Plan is extracted, the trajectory of the particular aircraft is computed. Other attributes such as clearance type may also be automatically computed by the flight management computer by comparing a lateral flight plan of particular aircraft and a target aircraft (in this case is the flight ID entered by the pilot, user or crew). Alternately, if a flight traffic plan cannot be extracted or extrapolated, the traffic flight plan can be manually inputted.

Initially (with a reference to FIG. 2), the pilot receives and enters an assigned spacing goal provided by ATC into target ASG field of the GUI of the FMS. The pilot may also select the spacing goal type by selecting an appropriate DIST/TIME option. Alternatively, the pilot may simply key in manually the ABP in an appropriate provided field in the interface of the GUI of the flight management computer (FMC) of the FMS. Next, the user interface page displays profile speeds which may be used to compute the interval management speed. With a reference to FIG. 6, at 610, once all the interval management parameters are entered, the FMC can generate trajectory for the target aircraft and at 615 for the particular aircraft based on a set of flight plan elements which have been extracted. If a trajectory of the target aircraft and the particular aircraft from the flight plan elements has been generated at 620 or more precisely successfully generated by meeting certain threshold requirements in integrity, the FMC can compute at 630, the dynamic time of arrival at the received ABP by adding a spacing goal at 640 to the ETA of the ABP of the target aircraft. At 640, if the spacing goal type is a distance type parameter, additional time is allotted or taken to cover the distance based on the profile speed of particular aircraft which is computed with the resultant time to cover the distance and this resultant time is added to ETA of the traffic at the ABP.

At 650, a resultant ETA is added as a time constraint for the ABP for a particular aircraft trajectory. That is, upon adding the time constraint to the ABP, the system would determine the time error or offset of the ABP by comparing the ETA of particular trajectory of the ABP with a time constraint. AT 660, the time error may then be converted from a time-based parameter to a speed base parameter by computing the average speed of the particular aircraft in the trajectory up until the ABP and the distance to this point along the trajectory. The distance determined also serves the addition function of an available distance to adjust the time error in incremental amount in accordance with the distance. That is, by adjust the time error over the entire available distance, a lesser amount at a particular instance of time change or step down or up in error offset is warranted rather a gradual change can be implemented. At 665, the profile speed is then recomputed by considering the delta change in speed required so that new profile speed adheres to characteristics of base speed mode selected. At 670, the particular aircraft trajectory is then regenerated, that is using the component of the profile speed which has been recomputed in 665. A reiteration process at 675 is instituted for error minimization where the profile speed and trajectory are re-computed in a feedback look until at 675 a determination is made that the error is within the limits or system has reached max number of iterations possible and no more change is likely or the time error cannot be further reduced. At 680, if the time error cannot be reduced further then the system may post a message indicating an inability to meet the interval management ASG with profile speed as the base speed. In such instance, the pilot may make a change in the profile speed selected so that system can reduce the error further to be within the error limits desired.

Also, (with a reference to FIG. 5 in conjunction with FIG. 6) alternately what-if scenarios may be generated, in an exemplary example, the pilot may toggle between multiple speed mode types which in turn may generate fuel usage details and such what-if scenarios of fuel usage can be displayed in a page of the FMS. In the case when an IM is not achieved using a particular speed mode, a notification or indicator can be immediately sent to notify to the pilot in the comparison page or section of the page of the FMS.

Additionally, continuously monitor for changes in external conditions that affect the speeds computed for achieving FIM (Wind, Temperature, etc.) can be performed in real-time. If there is a change beyond a threshold, the flow is re-performed so the computations results can be recomputed and indicate to the pilot how the external conditions have affected of changed the current scenarios such as affecting the speed mode selection. In response, the pilot may then re-select a speed mode based on the generated comparison results.

The various tasks performed in connection with processes 500-600 may be performed by software, hardware, firmware, or any combination thereof. For illustrative purposes, the preceding description of processes 500-600 may refer to elements mentioned above in connection with the FIGS. 1-4. In practice, portions of processes 500-600 may be performed by different elements of the described system. It should be appreciated that processes 500-600 may include any number of additional or alternative tasks, the tasks shown in the FIGS. 1-4 need not be performed in the illustrated order, and processes 500-600 may be incorporated into a more comprehensive procedure or process having additional functionality not described in detail herein. Moreover, one or more of the tasks shown in the FIGS. 1-6 could be omitted from embodiments of the processes 500-600 as long as the intended overall functionality remains intact.

Techniques and technologies may be described herein in terms of functional and/or logical block components, and with a reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1 and 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft management method that enables a user to select a speed profile mode for each phase of a flight plan, the method comprising:

retrieving, by a flight management computer (FMC), assigned space goals (ASG) corresponding to a plurality of achieve by point (ABP) designations for a target flight path that is associated with a target aircraft;

determining, by the flight management computer, a target air speed and applicable speed profile modes based in part on prior flight data of the target aircraft to compute a target flight path for the aircraft to achieve the ABP designations corresponding to an ASG retrieved;

generating, by the FMC, a graphical user interface (GUI) that allows a user to select, from a plurality of applicable speed profile modes which have been determined, at least one applicable speed profile mode for a phase of the target flight plan for the aircraft;

the generated GUI further allowing the user to compare at least a status of fuel remaining for a combination of the selection of the applicable speed profile mode and the phase of the target flight plan;

determining, by the FMC, from a particular speed profile mode, an estimated time of arrival for the ABP by the aircraft for each combination of selections; and enabling, via the generated GUI, the user to choose the combination of selections that achieves an optimum aircraft management for each phase of the flight plan by comparing the status of fuel remaining and determinations of estimated time of arrival to achieve the ABP designations for the aircraft for the flight plan to a destination.

2. The method of claim 1, further comprising:

indicating, by a plurality of indicators, a likelihood to achieve the retrieved ABP designation for the target flight plan.

3. The method of claim 2, further comprising:

determining, by a particular indicator, a speed variation of a selected speed mode wherein the particular indicator indicates a level of magnitude scaled for the speed variation for comparisons with each selectable speed mode.

4. The method of claim 1, further comprising:

computing a dynamic time of arrival for an ABP of a target aircraft by adding spacing goals to an estimated time of arrival (ETA) of the designated ABP of the aircraft.

5. The method of claim 4, further comprising:

computing a resultant time for an ETA of the aircraft by taking into account the spacing goal wherein the spacing goal is converted from a distance parameter to a time parameter to add to the resultant time to determine the ETA of the aircraft.

6. The method of claim 1, further comprising:

choosing the combination of selections that achieves an optimum aircraft management for each phase of the flight plan by ascertaining whether or not an interval management status is achievable or not.

7. The method of claim 5, further comprising:
comparing the ETA of the ABP of the aircraft with a dynamic time of arrival to determine a time error for ground speed and to adjust the ground speed to enable the ETA at the designated ABP for the aircraft to match the dynamic time of arrival of the ABP with the added time.

8. An aircraft management system that enables a user to select a speed profile mode for each phase of a flight plan, the system comprising:
an aircraft interface device (AID) configured to retrieve assigned space goals (ASG) corresponding to a plurality of achieve by point (ABP) designations for a target flight path that is associated with a target aircraft;
a flight management computer (FMC) in operable communication with the AID to retrieve prior flight data of the target aircraft therefrom, the FMC configured to (i) determine a target air speed and applicable speed profile modes and (ii) compute a target flight path for the aircraft to achieve the ABP designations corresponding to an ASG retrieved;
wherein the FMC is further configured to:
generate a graphic user interface (GUI) that enables a user to select, from a plurality of applicable speed profile modes which have been determined, at least one applicable speed profile mode for a phase of the target flight plan for the aircraft, the GUI further enabling the user to compare statuses of at least fuel remaining for a combination of the selection of the applicable speed profile mode and the phase of the target flight plan, and
compute an estimated time of arrival for the ABP by the aircraft for each combination of selections; and
wherein the GUI furhter enables the user to choose the combination of selections that achieves an optimum aircraft management for each phase of the flight plan by comparing comparisons of aircraft status of fuel remaining and determinations of estimated time of arrival to achieve the ABP designations for the aircraft for the flight plan to a destination.

9. The system of claim 8, further comprising:
a plurality of indicators of the GUI for indicating a likelihood to achieve the retrieved ABP designation for the target flight plan.

10. The system of claim 9, wherein the plurality of indicators further comprising:
a particular indicator to determine a speed variation of a selected speed mode wherein the particular indicator indicates a level of magnitude scaled for the speed variation for comparisons with each selectable speed mode.

11. The system of claim 9, wherein the FMC, further comprising:
a processor for computing a dynamic time of arrival for an ABP of a target aircraft by adding spacing goals to an estimated time of arrival (ETA) of the designated ABP of the aircraft.

12. The system of claim 11, further comprising:
a processor for computing a resultant time for an ETA of the aircraft by taking into account the spacing goal wherein the spacing goal is converted from a distance parameter to a time parameter to add to the resultant time to determine the ETA of the aircraft.

13. The system of claim 9, further comprising:
a GUI for choosing the combination of selections that achieves an optimum aircraft management for each phase of the flight plan by ascertaining whether or not an interval management status is achievable or not.

14. The system of claim 13, further comprising:
a processor for comparing the ETA of the ABP of the aircraft with a dynamic time of arrival to determine a time error for ground speed and to adjust the ground speed to enable the ETA at the designated ABP for the aircraft to match the dynamic time of arrival of the ABP with the added time.

15. A method carried-out by flight management system onboard an aircraft, the method comprising:
retrieving assigned space goals (ASG) from the onboard flight management system corresponding to a plurality of achieve by point (ABP) designations for a target flight path computed by a flight management computer of the aircraft wherein the target flight path is associated with a target aircraft;
determining a target air speed and applicable speed profile modes by retrieving prior flight data of the target aircraft to compute by the flight management computer, a target flight path for the aircraft to achieve the ABP designations corresponding to an ASG retrieved from the onboard flight management system;
selecting from a plurality of applicable speed profile modes which have been determined, at least one applicable speed profile mode for a phase of the target flight plan for the aircraft;
comparing statuses of the aircraft of at least a status of fuel remaining for a combination comprising a selection of the applicable speed profile mode and the phase of the target flight plan; and
computing based in part on a particular speed profile mode by the flight management computer, an estimated time of arrival for the ABP by the aircraft for each combination of selections of the applicable speed profile and target flight phase with remaining fuel status.

16. The method of claim 15, further comprising:
choosing the combination of selections that achieves an optimum aircraft management for each phase of the flight plan by ascertaining comparisons of aircraft status of fuel remaining and determinations of estimated time of arrival to achieve the ABP designations for the aircraft for the flight plan.

17. The method of claim 16, further comprising:
indicating, by a plurality of indicators, a likelihood to achieve the retrieved ABP designation for the target flight plan.

18. The method of claim 17, further comprising:
determining, by a particular indicator, a speed variation of a selected speed mode wherein the particular indicator indicates a level of magnitude scaled for the speed variation for comparisons with each selectable speed mode.

19. The method of claim 18, further comprising:
computing a dynamic time of arrival for an ABP of a target aircraft by adding spacing goals to an estimated time of arrival (ETA) of the designated ABP of the aircraft.

* * * * *